United States Patent [19]
Fayling

[11] 3,986,205
[45] Oct. 12, 1976

[54] DUAL PARTICLE POPULATION MAGNETIC RECORDING MEDIUM

[75] Inventor: Richard E. Fayling, White Bear Lake, Minn.

[73] Assignee: Minnesota Mining and Manufacturing Company, St. Paul, Minn.

[22] Filed: Jan. 27, 1975

[21] Appl. No.: 544,551

[52] U.S. Cl. ............................... 360/2; 360/131; 235/61.12 M; 340/149 A
[51] Int. Cl.² ...................................... G11B 25/04
[58] Field of Search ........................... 360/2, 131; 235/61.11 D, 61.12 M; 340/149 A

[56] References Cited
UNITED STATES PATENTS

| | | | |
|---|---|---|---|
| 3,864,754 | 2/1975 | Miklos et al. | 360/131 |
| 3,878,367 | 4/1975 | Fayling et al. | 235/61.12 M |

Primary Examiner—James W. Moffitt
Attorney, Agent, or Firm—Alexander, Sell, Steldt & DeLaHunt

[57] ABSTRACT

A magnetic recording medium having at least two particle populations that may be either contained in a single layer of magnetic medium or a dual layer of magnetic medium. In a first embodiment one of the particle populations of the medium is formed of conventional magnetic recording particles and the other population is highly anisotropic. In a second embodiment both particle populations are highly anisotropic but they are aligned so that the easy axes of magnetization of the populations are at an angle to one another. Also disclosed is a machine readable magnetic recording document that employs the magnetic recording medium of the present invention, and an apparatus for reading such document and validating the same.

15 Claims, 7 Drawing Figures

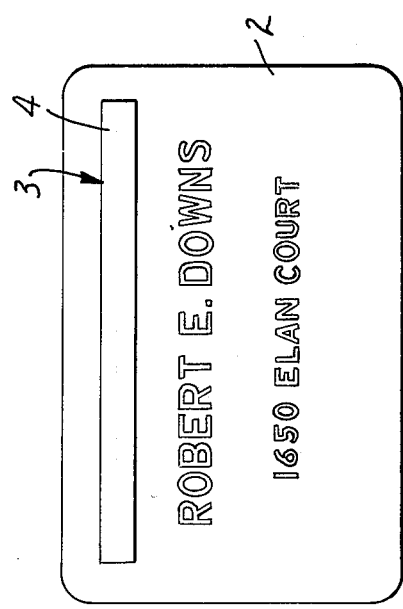
Fig. 3
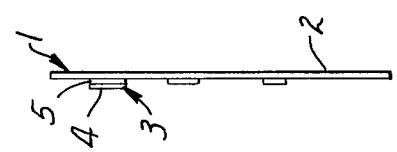
Fig. 4
Fig. 5
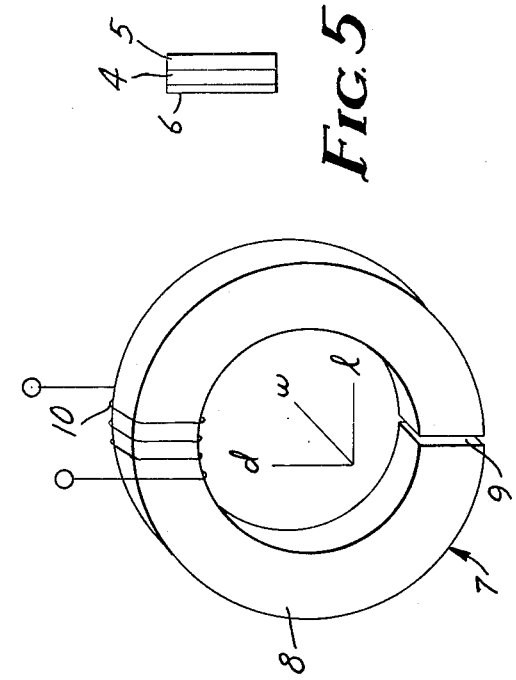
Fig. 6
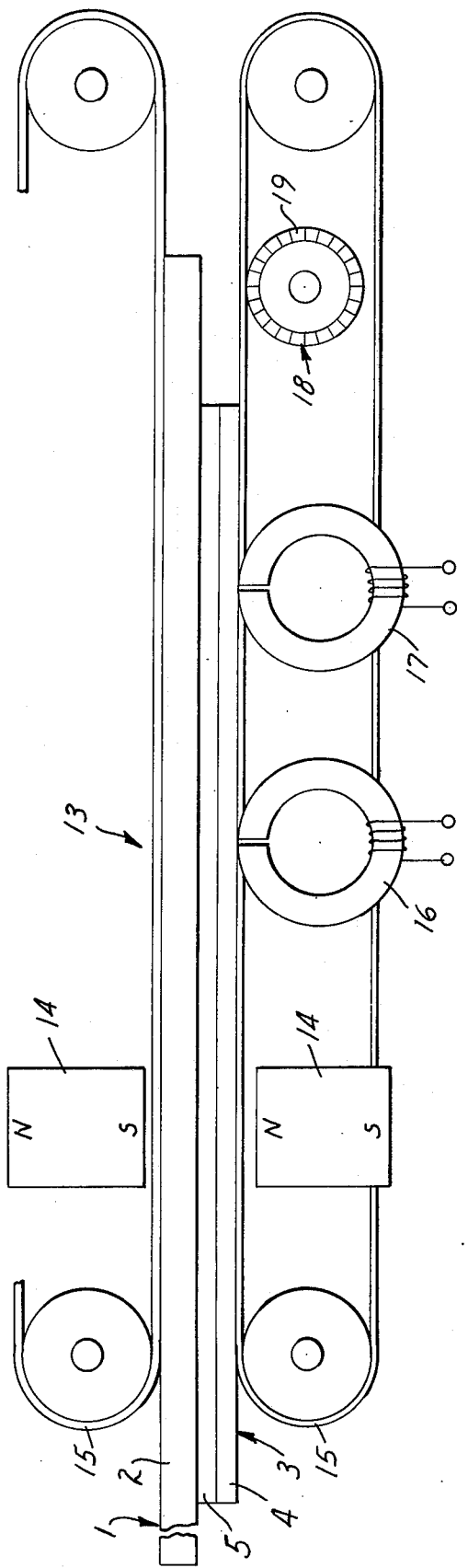
Fig. 7

DUAL PARTICLE POPULATION MAGNETIC RECORDING MEDIUM

CROSS REFERENCE: RELATED APPLICATION

This application is related to my copending application entitled "Magnetic Recording Medium With Highly Anisotropic Particles," Ser. No. 544,553, filed on even date herewith.

BACKGROUND OF THE INVENTION

1. Field of the Invention

The present invention relates in general to magnetic recording media and more specifically to recording media having a highly anisotropic magnetic recording characteristic.

2. Description of the Prior Art

Although performance quality of known magnetic media has reached a high level, many uses now exist for magnetic media wherein the usual high quality parameters of such media are less important. For example, in some instances it may be more desirable to provide a magnetic medium that is magnetizable or erasable by only particular magnetic fields than to provide a medium with high reproduction qualities. One highly useful application of a medium magnetizable or erasable by only certain magnetic fields is in the area of machine readable magnetically encoded documents such as credit cards.

As society becomes more and more dependent upon the use of credit cards and other substitutes for currency, the need for counterfeit and fraud resistant currency substitutes is ever increasing. Various known currency substitutes are adapted to reduce their use for unauthorized purposes, as evidenced by a U.S. Patent to Holm et al., No. 3,566,356, assigned to the assignee of the present invention.

The Holm et al patent discloses a magnetic recording document having a recording medium composed of two magnetizable particle populations that differ from one another in that one population has a relatively low intrinsic coercive force and the other population has a relatively high intrinsic coercive force. The coercive forces of the two particle populations are chosen to provide a gradual demagnetization curve that may be employed to test the validity of the document. Also, Holm et al. discloses the use of a sophisticated test for validating the document by the dual recording of information in both populations in a sequence designed to indicate the presence of both high and low coercive force particle populations. Although the Holm et al document provides certain safeguards over nonmagnetic currency substitutes, there is a strong need for even more secure substitutes.

SUMMARY OF THE INVENTION

The present invention provides a magnetic recording medium having two or more particle populations at least one of which is uniaxially highly anisotropic with an easy axis of magnetization and an easy axis intrinsic coercive force less than 1900 oersteds. The anisotropy of the highly anisotropic population is such that when the population is initially magnetized with a field of at least 2500 oersteds applied along the easy axis of the population, the level of residual magnetic moment of the population will be greater than 40% of the initial residual magnetic moment after the application along a hard axis of the population of an a.c. erase field of peak value equal to two times the intrinsic easy axis coercive force of the population.

In a first preferred embodiment one of the particle populations of the recording medium of the present invention is formed of conventional magnetic particles and the other population is a highly anisotropic population that may be erased by an erase field applied along its easy axis but will not substantially be affected by an erase field applied along one of its hard axes. Thus, recorded signals may be selectively erased from the conventional particle population without also erasing signals on the highly anisotropic population. In a second preferred embodiment, both particle populations of the recording medium of the present invention are formed of highly anisotropic populations that have their easy axes oriented perpendicular to one another. As a result, selective encoding and erasing of either of the populations may be performed.

Because of the exceptional magnetic anisotropic properties of at least one of the particle populations, an intense magnetic response is observed along the easy axis of magnetization of such particles, whereas the magnetic response observed along the hard axis of magnetization is negligible. Thus, such particles appear to be virtually nonmagnetic along their hard axis. Accordingly, the highly anisotropic particles may be selectively magnetized and demagnetized along their easy axis of magnetization, but exposure to relatively intense magnetic fields along their hard axes has little effect.

The magnetic recording medium of the present invention may be employed in a machine readable magnetically encoded decument having a substrate layer of nonmagnetizable material and a strip of the magnetic recording medium of the present invention carried on the substrate layer. A method is disclosed for validating such a document to prevent unauthorized use. Also disclosed is an apparatus for reading magnetically encoded data from such document and for indicating whether the document includes a magnetic medium of the present invention. Such apparatus has a magnetic field sufficient to erase data or other recorded material from one of the particle populations of the recording medium without affecting recorded signals on the other particle population, and also has means for reading such signals on the other particle population after the erasure of the one population.

The foregoing and other advantages of the present invention will appear from the following description. In the description reference is made to the accompanying drawings, which form a part hereof, and in which there is shown by way of illustration, and not of limitation, specific forms in which the invention may be embodied. Such embodiments do not represent the full scope of the invention, but rather the invention may be employed in a variety of embodiments, and reference is made to the claims herein for interpreting the breadth of the invention.

BRIEF DESCRIPTION OF THE DRAWINGS

FIG. 3 is a a plan view of a magnetically encoded document incorporating a preferred embodiment of the recording medium of the present invention, which medium includes two magnetizable strips;

FIG. 4 is an end view of the encoded document of FIG. 3;

FIG. 5 is an end view of the recording medium of FIG. 3 together with a third magnetizable strip;

FIG. 6 is a view in perspective of a standard magnetic read/record head; and

FIG. 7 is a schematic view of an apparatus for reading the encoded data of the document of FIG. 3.

DESCRIPTION OF THE PREFERRED EMBODIMENTS

The present invention provides a magnetic recording medium having two or more magnetic particle populations, at least one of which is uniaxially highly anisotropic but yet has an intrinsic coercive force less than 1900 oersteds. The term "uniaxially highly anisotropic" is defined herein to mean that when a magnetic particle population is initially magnetized with a field at least 2500 oersteds applied along an easy axis of the population, the level of residual magnetic moment of the population will be greater than 40% of the initial residual magnetic moment after the application along one of the hard axes of the population of an a.c. erase field of peak value equal to two times the intrinsic easy axis coercive force of the population.

The recording medium of the present invention is preferably formed by coating the highly anisotropic particles in an organic binder in a uniformly aligned fashion to produce a single easy axis of magnetization. An intense magnetic response is observed along such easy axis of magnetization and a relatively square hysteresis loop is associated therewith. In contrast, the magnetic response observed due to a magnetic field of 1,000–3,000 oersteds applied along an axis normal to the easy axis of the medium (i.e. along a hard axis of magnetization) is negligible.

The highly anisotropic magnetic recording particles employed in the recording medium of the present invention preferably are hexagonal ferrite particles that are generally euhedral platelets. Examples of material suitable for such particles are lead, barium and strontium ferrites such as disclosed in U.S. application Ser. No. 368,500, filed June 11, 1973 and herein incorporated by reference and iron cobalt phosphide. It is also believed that several other types of material such as other transition metal phosphides, yttrium cobalt, rare earth compounds, manganese bismuth, Alnico compounds, iron-cobalt alloys, chromium dioxide or iron borides would exhibit highly anisotropic behavior of the type desired if single domain size particles of sufficient crystal perfection are developed from such materials.

Figure 1:
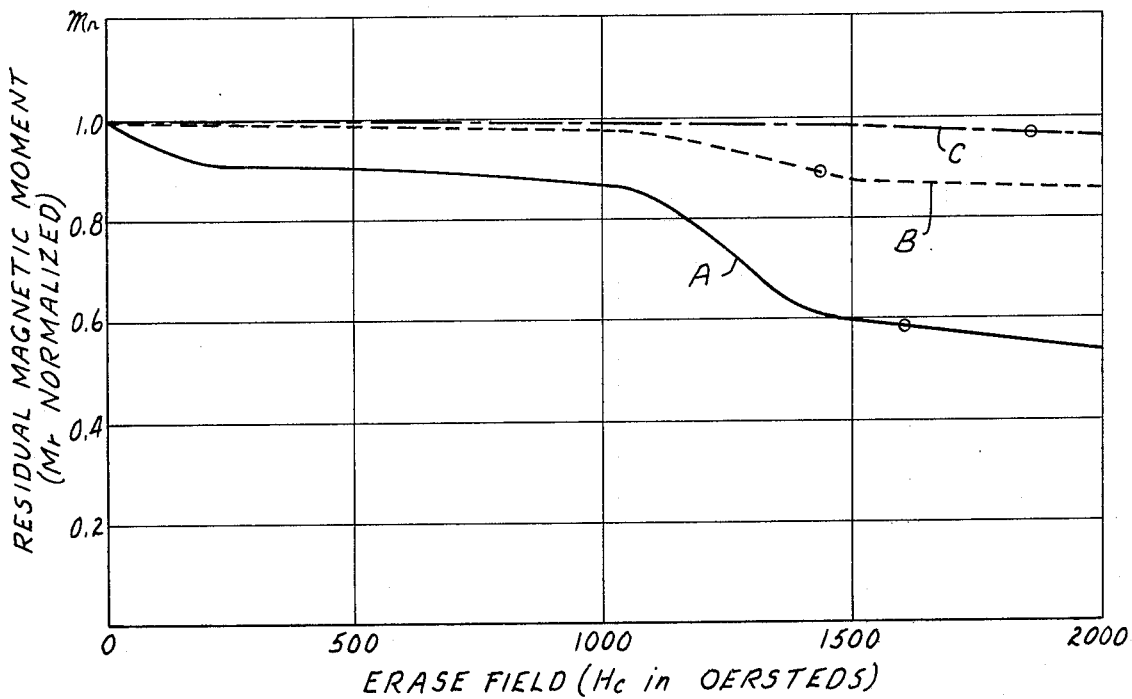
FIG. 1 is three graphs of the residual magnetic moment vs. hard axis erase field characteristics or highly anisotropic particle populations that may be employed in forming the present invention.
Figure 2:
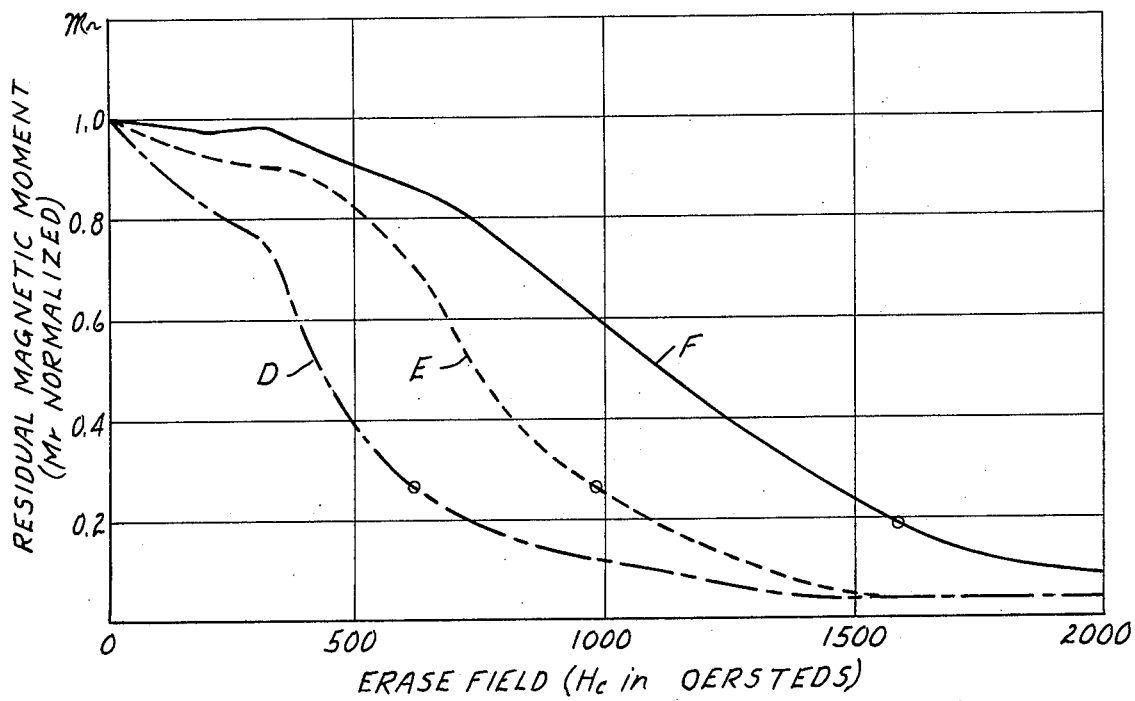
FIG. 2 is three graphs of the residual magnetic moment vs. hard axis erase field characteristics for conventional recording particle populations that may be employed in forming the present invention.

Referring now to FIGS. 1 and 2 of the drawings, FIG. 1 illustrates graphs of residual magnetic moment vs. hard axis erase field characteristics of three representative samples of particles that may be used in forming the highly anisotropic particle population of the magnetc media of the present invention and FIG. 2 illustrates graphs of the same parameters of three known magnetic media. In FIG. 1, graphs A, B and C respectively indicate the performance of an iron cobalt phosphide sample and two barium ferrite samples. The samples each comprised four stacked layers of ¼ in. circular disks of magnetic recording tape with parallel aligned easy axes of magnetization. The tapes were prepared by coating dispersions of the various types of magnetic particles in standard binder systems onto 1–1½ mil. polyester film using alignment methods described in a U.S. Patent to von Behren, No. 2,711,901 to produce an easy axis parallel to the longitudinal dimension of the samples. The hard axis erase fields were applied parallel to the plane of the samples, to eliminate possible errors due to shape effects. In FIG. 2, graphs D, E and F respectively indicate the performance of equant magnetite, chromium oxide, and cobalt doped iron ferrous oxide samples. The ordinates of the graphs of FIGS. 1 and 2 represent the levels of residual magnetic moments of the samples and have been normalized for purposes of clarity. None of the coercive forces of the samples of the graphs of FIGS. 1 and 2 are the same and, therefore, the coordinates of twice the coercive force of each sample are indicated by circles on the graphs.

To determine the coordinates for plotting the graphs of FIGS. 1 and 2, a magnetic field of approximately 3000 oersteds was applied along the easy axis of each sample to induce an initial magnetic moment therein approaching saturation. Subsequently, the field was removed and the resulting level of residual magnetic moment of each sample was measured with a vibrating sample magnetometer. Such levels of residual magnetic moment were used as base levels. Next, individual readings of decreases in the levels of residual magnetic moment of each sample in response to hard axis erase fields were obtained by applying an a.c. erase field perpendicular to the easy axis of each sample and then measuring the residual magnetic moment remaining after such field application. Initially the a.c. field was applied at a low level and then progressively increased and a measurement was made of the residual magnetic moment remaining after the application of each level of erase field.

After a hard axis erase field equal to two times the coercive force was applied perpendicular to the easy axis of the highly anisotropic samples, they each had a level of residual magnetic moment remaining that was considerably higher than 40% of their base levels of residual magnetic moment (they ranged between 58% and 96% of such base level moment). The non-highly anisotropic samples in contrast did not have over 30% of their base levels of residual magnetic moment remaining after the application of an a.c. erase field equal to two times the coercive force (they ranged between 18% to 27%). Gamma iron oxide, which is the most common recording material available, is not covered in the graphs but was also found to fall within such 18% to 27% range. Although the samples were magnetized with a field of approximately 3000 oersteds to insure that they were sufficiently magnetized to provide meaningful results, a lower field could have been used so long as the samples were magnetized to at least 50% of their saturated magnetic moment.

The highly anisotropic particles make the magnetic recording medium of the present invention particularly suitable for use in magnetically encoded documents that may be employed together with a document reading apparatus (as described in detail below) to provide a system that significantly impedes the unauthorized use of such documents. Magnetically encoded documents of the present invention are advantageously employable in counterfeit resistant and fraud resistant systems as evidenced by a document 1, shown in FIGS.

3 and 4. The document 1 is formed of a nonmagnetic substrate layer 2 that carries a magnetic recording medium 3 of the present invention having two magnetizable strips 4 and 5 positioned in a stacked relationship to one another. In certain applications, it may be advantageous to sandwich the recording medium 3 between two nonmagnetic layers 2 in order to protect the layer 3 against physical damage or other hazards that could degrade its recording capability. The medium 3 may be applied to the layer 2 by several methods such as direct coating, coating on an intermediate substrate and subsequently transferring the coating, or bonding by means of an adhesive.

The construction of the document 1 is particularly useful because it provides two separable levels of magnetically recorded signals on the same track of the strips 4 and 5. One of these signals may be a data signal recorded on the strip 5, which strip is comprised of highly anisotropic magnetic recording particles. The other signal may be a noise signal that is recorded on the strip 4, which is formed of either conventional recording pulses preferably having a lower coercive force than that of the particles of the strip 5, or highly anisotropic magnetic recording particles with an easy axis of magnetization oriented perpendicular to that of the strip 5. It is preferably that the strip 4 be positioned on top of the strip 5 in order that when the document 1 is passed by a read/record transducer, the strip 4 will be closest to the gap of the transducer and thereby be in a stronger part of the magnetic field of the transducer than that which the strip 5 will be in. However, such positioning of the strips 4 and 5 is not essential to the present invention.

Although two separate and distinct magnetizable strips are shown in FIGS. 3 and 4, to provide two recorded signals on the same track, it is possible in applications wherein the recording medium 3 is formed of highly anisotropic particles and conventinal particles, both particle populations of magnetic material may be intermixed within the same strip. Each particle population of such a strip will act as a separate magnetizable strip in response to signal separation using hard axis magnetic fields.

If the noise strip 4 is formed with conventional recording material and it is desired that none of the data signal is present on the strip 4 after encoding is completed, the data strip 5 should be recorded first. Since the coercive force of the noize strip 4 is preferably lower than that of the data strip 5, data will initially be recorded on both the strips 4 and 5. The data signal on the noise strip 4 can then be erased using a hard axis field before the noise signal is encoded thereon or simply overwritten by the noise signal. The noise signal should be recorded at a magnetic field level too low to erase any data on the strip 5 (i.e. below the easy axis coercive force of the strip 5, but larger than the coercive force of the noise strip 4).

If desired, the data strip 5 may be place on top of the noise strip 4 to place it in an outer position with respect to that of the strip 4 and thereby operatively increase the magnetic field applied on the strip 5 when the card is passed by a read/record transducer. Also, as shown in FIG. 5, a third magnetizable strip 6 may be included in the medium 3. The strip 6 may have a substantially higher coercive force than those of the strips 4 and 5 and/or have an easy axis of magnetization oriented at an angle to those of the strips 4 and 5 to provide a third recording track.

Because the document 1 can be recorded with both data and noise signals superimposed on the same track of two different magnetizable strips, the document 1 is highly resistant to being used in making duplicate fraudulent documents. Duplicate documents are generally made by contact duplication, or reading and re-recording but such duplication of the document 1 is prevented by the superimposition of noise signals unless they are separated by using a hard axis erase field or other selective erasure based on difference in coercivity.

The data strip 5 preferably has a single easy axis of magnetization along the longitudinal dimension of the document 1, and two of the family of hard axes of magnetization are respectively in the plane of the document 1 and perpendicular to the plane of the document 1. The strips 4 and 5 may be encoded with magnetically recorded digital data by moving the document 1 at a constant relative velocity past a standard magnetic read/record head 7, as shown in FIG. 6, driven by electrical signal currents representing digital data.

The read/record head 7 is a conventional ring-type head used in recording or reproducing magnetic signals from magnetic recording media. The head 7 includes a core 8 that has a small magnetizing gap 9 and an electrical coil 10 that is wound around a portion of the core 8 and is connected to conventional electronic circuitry (not shown) that sense induced magnetization of the core 8. The orthogonal axes ($w, l, d$) are illustrated with the read/record head 7 to indicate the direction of gap width, gap length and gap depth respectively. Time varying currents through the coil 10 induce time varying magnetization in the core 8, resulting in a time varying magnetizing field across and adjacent the gap 9 with components substantially along the "$l$" and "$d$" axes only. The $l$ and $d$ components of such field may be used to record magnetization patterns corresponding to electrical signals on a magnetic recording surface translating across the gap 9. In a conventional two frequency coherent phase recording for encoding magnetic strip credit cards, the strips 4 and 5 may be magnetized to saturation with reversals of direction of the saturating field of the record head 7 corresponding to clock pulses and data bits. Usually the relative motion of translation of a conventional recording medium is along the $l$ axes of the head, but the relative translation of the medium may be at an angle "$a$" in the $l$–$w$ plane. Small angles of $a$ (less than 50°) are preferred, but angles up to 90° are possible.

Magnetic recording documents of the present invention may also be encoded as they are translated by the gap 9 of the read/record head 7 with relative motion of translation along the $l$ axis, but with the easy axis of the documents at a small angle $a$ (not shown) in the $l$–$w$ plane. For optimum recording the easy axis of magnetization of the documents should be approximately parallel to the $l$–$d$ plane. Thus, the direction of the easy axis can be varied if a corresponding variation in the direction of the gap length is made to maintain a substantially parallel relationship between the $l$–$d$ plane and the direction of the easy axis of magnetization of the recording document.

In recording signals on the two strips 4 and 5 if they are both formed from highly anisotropic materials with easy axes perpendicular to one another it generally makes little difference which strip 4 or 5 is recorded first but two separate heads 7 are required, with the gaps of the two heads perpendicular to one another.

Referring now to FIG. 7, there is shown an apparatus 13 for reading the document 1. The apparatus 13 is equipped with a magnetic field source in the form of a pair of noise erase permanent magnets 14 positioned on each side of the document 1. However, the magnets 14 may be both positioned on the side of the document 1 on which the strips 4 and 5 are affixed. In fact, in certain applications it may be more advantageous to have the magnets 14 on one side to apply a hard axis field in the plane of the document 1 and thereby minimize undesirable shape effects associated with magnetization perpendicular to the plane of the strips 4 and 5. The magnets 14 provide a d.c. magnetic field to which the strips 4 and 5 of the document 1 are exposed. Such field is applied along one of the hard axes of magnetization of the data strip 5 and should be sufficient to produce erasure of the noise strip 4. The document 1 is translated through the apparatus 13 from left to right between two endless belts 15 and first passes between the magnets 14 so that the noise strip 4 is erased. The data strip 5 is not erased by the magnets 14 due to its resistance to erasure by hard axes fields. Upon the removal of the noise signal from the strip 4 the document 1 moves to a first read/record head 16 where the remaining encoded data on the data strip 5 is read. Next, the document 1 is moved to a second read/record head 17 where selective recording of updated data may take place. Before being ejected from the apparatus 13, the document 1 may be passed by a roller wheel 18 having a thin layer 19 of alternately magnetized "Plastiform" brand magnet material designed to again magnetize a noise signal pattern on only the low intrinsic coercive force noise strip 4.

The provision of the hard axis field source is not restricted solely to the use of permanent magnets 13 but instead may be provided by current carrying coils, electromagnets, or a transversely oriented erase head. However, the permanent magnets are advantageous to use because they do not require a power source. Because the magnetizable data strip 5 of the document 1 is formed of highly anisotropic material, the magnetized regions along the easy axis of the strip 5 will not be sufficiently affected by the hard axis field to erase recorded data thereon, which data is retained and read as the document 1 passes by the first read/record head 16.

An optional station (not shown) may be added to the apparatus 13 for the purpose of detecting the absence or alteration of noise on the document 1. Such a station would be preferably located between the point where the document 1 initially enters the apparatus 13 and the point where the noise signal is erased. When the document 1 enters the apparatus 13, this additional station may determine if the noise code present on the noise strip 4 corresponds to a predetermined frequency not present on the data strip 5. Detecting the predetermined frequency or its absence can be accomplished simply by using a third read/record head connected to a frequency sensitive amplifier-detector circuit. More sophisticated equipment may be utilized to detect alternation of the noise code.

Following below are a number of examples of the type of documents employing magnetic media of the present invention, which examples are described for purposes of illustration only and not limitation.

EXAMPLE 1

A magnetically encoded document of the present invention is formed of a plastic nonmagnetic substrate coated on one side with a noise strip of gamma iron oxide having a coercivity of 265 oersteds, and a data strip coated on top of the noise strip and composed of barium ferrite having a coercivity of 778 oersteds. The easy axis of magnetization of each magnetizable strip is oriented parallel to the longitudinal axis of the document.

EXAMPLE 2

A document is formed as described in Example 1 except that the easy axis of the barium ferrite strip is oriented at an angle $a$ to the longitudinal axis of the document.

EXAMPLE 3

A document is formed as described in Example 1 except that a second barium ferrite strip is substituted for the gamma iron oxide strip and is oriented with its easy axis perpendicular to the longitudinal axis of the document.

EXAMPLE 4

A document is formed as described in Example 3 except that the first barium ferrite strip is oriented with its easy axis at an angle $a$ to the longitudinal axis of the document and the easy axis of the second barium ferrite strip is oriented perpendicular to the easy axis of the first strip.

What is claimed is:

1. A magnetic recording medium comprising:
    a first population of magnetic recording particles; and
    at least a second population of uniformly aligned uniaxially highly anisotropic magnetic recording particles with an easy axis and a plurality of hard axes of magnetization and an easy axis intrinsic coercive force less than 1900 oersteds, whereby when said second population is initially magnetized with a field of at least 2500 oersteds applied along said easy axis, the level of residual magnetic moment of said population will be greater than 40% of the initial residual magnetic moment after the application along one of said hard axes of an a.c. erase field of peak value equal to two times the intrinsic easy axis coercive force of the second population.

2. A magnetic recording medium as recited in claim 1, wherein said first and second particle populations are intermixed together to form a single layer of particles, and said first particle population has a coercive force less than that of said second particle population.

3. A magnetic recording medium as recited in claim 1, wherein each of said first and second particle populations are arranged in a separate layer to form two layers of magnetic particles arranged in a stacked relationship with one another.

4. A magnetic recording medium as recited in claim 3, wherein said first particle population is uniformly aligned, uniaxially highly anisotropic and has an easy axis of magnetization that is perpendicular to the easy axis of magnetization of said second particle population.

5. A magnetic recording medium as recited in claim 1, wherein said magnetic particles of said second population are formed of one or more barium, strontium and lead ferrites.

6. A magnetic recording medium as recited in claim 5, wherein the intrinsic coercive force of said second population is no more than 1600 oersteds.

7. A magnetic recording medium as recited in claim 1, wherein said medium is carried in surface-to-surface contact with a substrate layer of nonmagnetizable material to form a machine readable magnetically encoded document.

8. A magnetic recording medium as recited in claim 7, wherein said easy axis of magnetization of the magnetic particles of said second population is oriented parallel to the longitudinal axis of said encoded document.

9. A magnetic recording medium as recited in claim 1, wherein said medium further includes a third population of magnetic recording particles having an intrinsic coercive force substantially higher than that of said first and second populations.

10. A magnetic recording medium as recited in claim 1, wherein said medium further includes a third population of uniformly aligned uniaxially highly anisotropic magnetic recording particles with hard and easy axes of magnetization, and said easy axis of said third population is oriented at an angle to said easy axis of said second population.

11. A machine readable magnetically encoded document having a substrate nonmagnetizable material; and a magnetic recording medium comprising:

a first population of magnetic recording particles; and at least a second population of uniformly aligned uniaxially highly anisotropic magnetic recording particles with an easy axis and a plurality of hard axes of magnetization and an easy axis intrinsic coercive force less than 1900 oersteds, whereby when said second population is initially magnetized with a field of at least 2500 oersteds applied along said easy axis, the level of residual magnetic moment of said population will be greater than 40% of the initial residual magnetic moment after the application along one of said hard axes of an a.c. erase field of peak value equal to two times the intrinsic coercive force of the second population.

12. A machine readable magnetically encoded document as recited in claim 11, wherein said first and second particle populations are intermixed together to form a single layer of particles, and said first particle population has a coercive force less than that of said second particle population.

13. A machine readable magnetically encoded document as recited in claim 11, wherein each of said first and second particle populations are arranged in a separate layer to form two layers of magnetic particles arranged in a stacked relationship with one another.

14. A machine readable magnetically encoded document as recited in claim 11, wherein said first particle population is uniformly aligned uniaxially highly anisotropic and has an easy axis of magnetization that is perpendicular to the easy axis of magnetization of said second particle population.

15. A method of validating a document comprising the following sequential steps:

1. incorporating into the document a first particle population of magnetic particles and a second particle population of magnetic particles, which second population is uniaxially highly anisotropic and has an easy axis of magnetization and a family of hard axes of magnetization;
2. magnetizing said second particle population with encoded data by means of a magnetic field parallel to the easy axis of magnetization of said second population;
3. magnetizing said first population with noise signals by means of a magnetic field having a negligible magnetizing effect on said second population;
4. exposing said document to an a.c. magnetic field sufficient to erase said noise from said first population but not sufficient to erase the data on said second population; and
5. reading said encoded data of said second population with a magnetic transducer.

* * * * *